US010280952B2

(12) United States Patent
Claflin et al.

(10) Patent No.: US 10,280,952 B2
(45) Date of Patent: *May 7, 2019

(54) VACUUM POWERED LIFTING MECHANISM

(71) Applicant: B/E Aerospace, Inc., Wellington, FL (US)

(72) Inventors: Shawn A. Claflin, Seattle, WA (US); James B. Hauser, Clinton, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 429 days.

This patent is subject to a terminal disclaimer.

(21) Appl. No.: 15/284,268

(22) Filed: Oct. 3, 2016

(65) Prior Publication Data

US 2017/0023028 A1 Jan. 26, 2017

Related U.S. Application Data

(63) Continuation of application No. PCT/US2015/023707, filed on Mar. 31, 2015.
(Continued)

(51) Int. Cl.
*F15B 15/14* (2006.01)
*B64D 11/00* (2006.01)
(Continued)

(52) U.S. Cl.
CPC ............ *F15B 15/149* (2013.01); *B64D 11/00* (2013.01); *B64D 11/003* (2013.01); *F15B 15/10* (2013.01);
(Continued)

(58) Field of Classification Search
CPC .................. B64D 11/003; F15B 15/10; F15B 2211/8757; F16J 3/06
(Continued)

(56) References Cited

U.S. PATENT DOCUMENTS 3,319,532 A 5/1967 Pridham, Jr.
4,597,320 A 7/1986 Kamio
(Continued)

FOREIGN PATENT DOCUMENTS

CN 101054966 A 10/2007
DE 198 00 588 A1 7/1999
(Continued)

OTHER PUBLICATIONS

European Search Report issued in related application EP 17194794. 8, dated Jan. 8, 2018, 9 pages.
(Continued)

*Primary Examiner* — Christopher P Ellis
(74) *Attorney, Agent, or Firm* — Clements Bernard Walker PLLC

(57) ABSTRACT

In an illustrative embodiment, a vertically stowable aircraft storage unit for providing additional storage in a cabin area of an aircraft includes a storage compartment, a vacuum lift mechanism, and a stowage container housing. The vacuum lift mechanism may include at least one vacuum actuator, and an air manifold in fluid communication with a vacuum source, the air manifold configured to provide vacuum and venting to the at least one vacuum actuator. The stowage container housing may be configured to receive the storage compartment in the stowed position and may be configured for mounting above a ceiling of the cabin area. The vacuum actuator may be mounted for lifting and lowering the storage compartment between the stowed position and a deployed position

20 Claims, 10 Drawing Sheets

Related U.S. Application Data

(60) Provisional application No. 61/974,095, filed on Apr. 2, 2014.

(51) Int. Cl.
  *F16M 13/02* (2006.01)
  *F16J 3/06* (2006.01)
  *F15B 15/10* (2006.01)
  *B64D 11/04* (2006.01)

(52) U.S. Cl.
  CPC .............. *F16J 3/06* (2013.01); *F16M 13/022* (2013.01); *B64D 11/04* (2013.01); *F15B 2211/411* (2013.01); *F15B 2211/41581* (2013.01); *F15B 2211/7052* (2013.01); *F15B 2211/7053* (2013.01); *F15B 2211/89* (2013.01)

(58) Field of Classification Search
  USPC ....................................................... 244/118.5
  See application file for complete search history.

(56) References Cited

U.S. PATENT DOCUMENTS

| | | | |
|---|---|---|---|
| 5,441,218 A | 8/1995 | Mueller et al. | |
| 6,088,239 A * | 7/2000 | Zeiss ................... | B64D 11/003 244/118.1 |
| 10,000,287 B2 * | 6/2018 | Claflin ................ | B64D 11/003 |
| 2002/0145080 A1 * | 10/2002 | Renken ................ | B64D 11/02 244/118.5 |
| 2002/0153453 A1 * | 10/2002 | Kamstra .............. | B64D 11/003 244/118.5 |
| 2005/0230195 A1 * | 10/2005 | Jones ................... | E05B 47/0009 188/68 |
| 2007/0240564 A1 | 10/2007 | Uehara et al. | |
| 2008/0078873 A1 | 4/2008 | Schalla et al. | |
| 2009/0010772 A1 * | 1/2009 | Siemroth ............... | F16J 3/06 417/400 |
| 2013/0186999 A1 * | 7/2013 | Huber ..................... | B64D 9/00 244/118.1 |
| 2013/0328361 A1 * | 12/2013 | Egan ..................... | B64D 11/06 297/188.01 |
| 2014/0377017 A1 * | 12/2014 | Panzram ............... | B65G 51/03 406/88 |
| 2015/0285278 A1 * | 10/2015 | Claflin .................. | B64D 11/00 248/318 |
| 2017/0023027 A1 * | 1/2017 | Claflin .................. | B64D 11/04 |
| 2019/0031351 A1 * | 1/2019 | Roth .................... | B64D 11/003 |
| 2019/0032685 A1 * | 1/2019 | Foster ................... | F16K 5/184 |

FOREIGN PATENT DOCUMENTS

| | | | | |
|---|---|---|---|---|
| EP | 1 249 392 A1 | 10/2002 | | |
| EP | 3305661 A1 * | 4/2018 | ............. | B64D 11/04 |
| FR | 2 950 605 A1 | 4/2011 | | |
| WO | 2015/153682 A1 | 10/2015 | | |
| WO | 2017/003814 A1 | 1/2017 | | |

OTHER PUBLICATIONS

International Search Report dated Jun. 22, 2015 for PCT/US2015/023707 filed Mar. 31, 2015.
International Written Opinion dated Jun. 22, 2015 for PCT/US2015/023707 filed Mar. 31, 2015.
Office Action issued in related application CN 201580024652.1, with English language translation, dated Sep. 15, 2017, 16 pages.
Second Office Action issued in related application CN 201580024652.1, with English language translation, dated May 10, 2018, 8 pages.

* cited by examiner

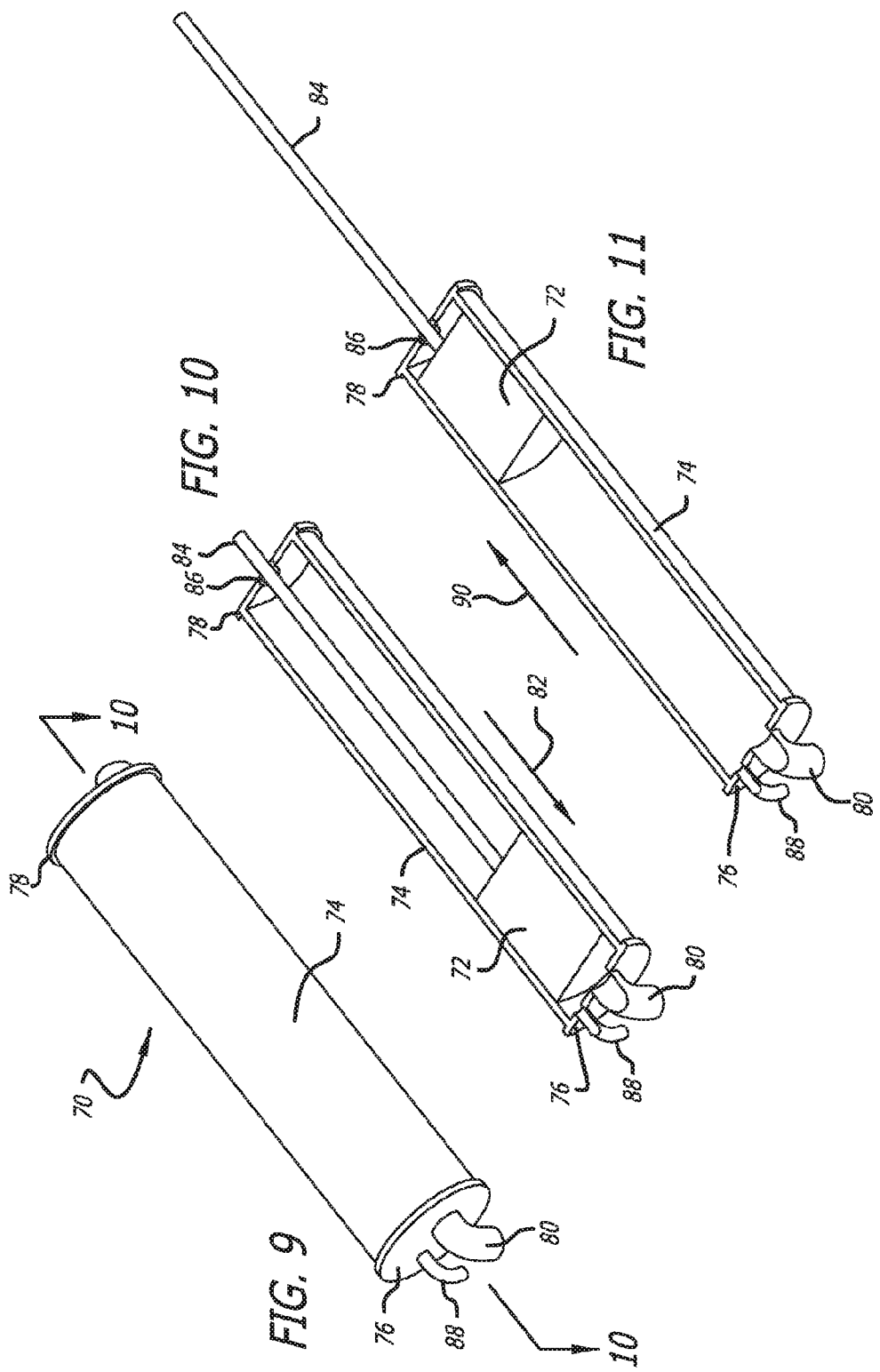

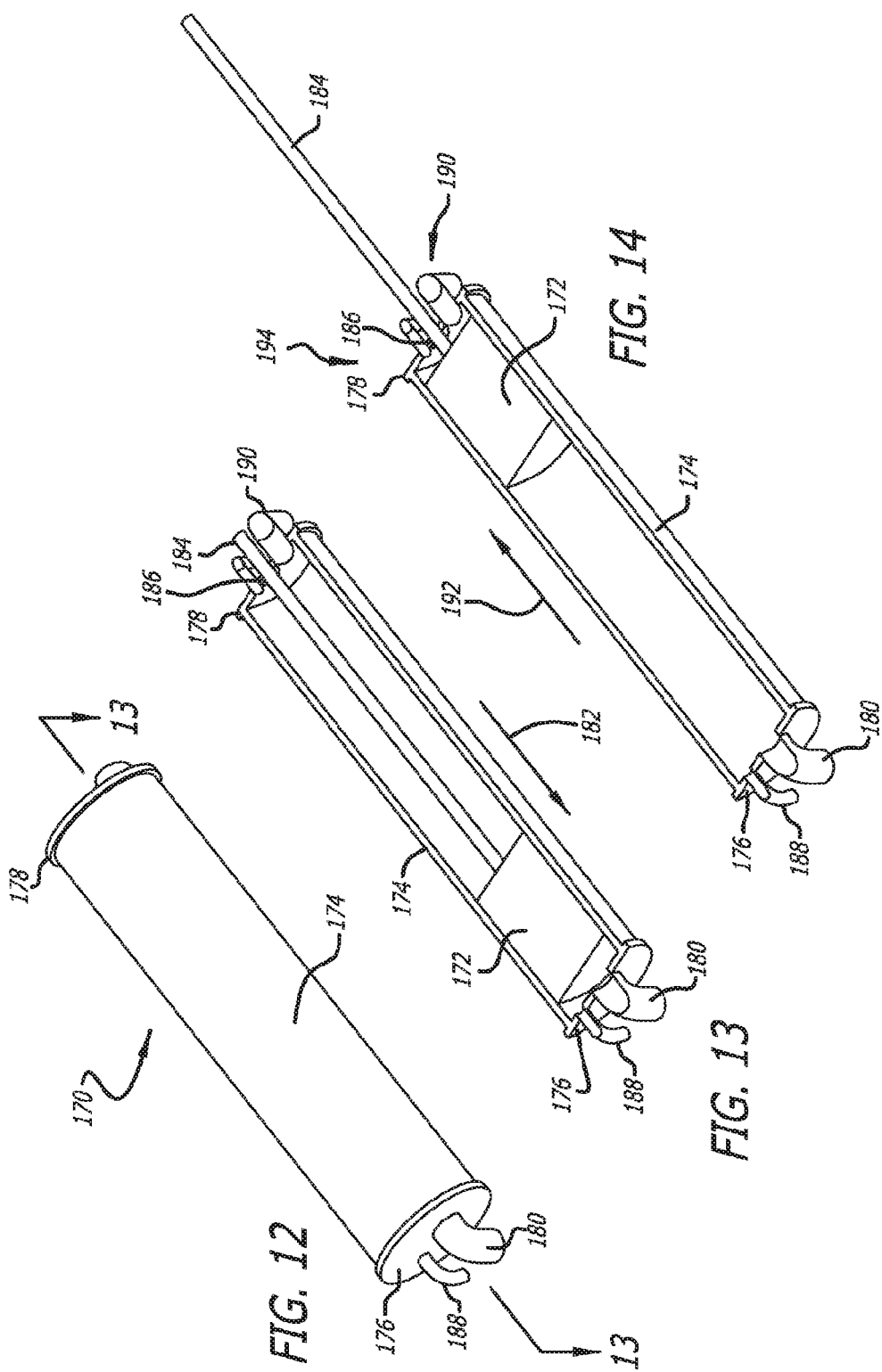

VACUUM POWERED LIFTING MECHANISM

CROSS REFERENCES TO RELATED APPLICATIONS

This application is a bypass continuation of and claims priority to PCT Application No. US2015/023707 filed Mar. 31, 2015; which claims priority to U.S. Provisional Application No. 61/974,095, filed Apr. 2, 2014, the contents of each of which are incorporated by reference in their entirety.

BACKGROUND

The present invention relates generally to lift assist mechanisms, and more particularly to vacuum powered lifting systems for moving a movable component such as an aircraft stowage bin or container.

Pivoting aircraft overhead stowage bins or containers typically rely on force provided by an operator, such as a passenger or flight attendant, for example, to close and secure the stowage container, and typically have no operator assist. Springs or other simple mechanisms designed to assist in moving stowage containers or devices generally force users to pull downward on the container or device for loading when it is empty or only lightly loaded, and to push upward on the container or device when it is fully loaded.

Power-assisted stowage bin systems have been used as an attempt to solve this problem. For example, a powered stowage bin system is known that includes a powered stowage bin lift system, which unlatches the stowage bin and provides a powered lifting force controlled by a cabin management system. Furthermore, powered systems have been used as an alternative to manual force in other aircraft-related applications such as opening and closing lavatory doors and crew rests and compacting trash. For example, a trash management system is known that includes a piston adapted to compact trash within a trash vessel, and a passageway connected to a vacuum trash disposal, where power for the piston crushing force is provided by a vacuum source.

However, typically such systems use an electric motor, which can be disadvantageous. For example, in the case of electrical failure or reduced electrical power, a passenger or flight attendant may be trapped in a lavatory or injured by a lowered stowage bin, causing safety concerns. Furthermore, constant use of electricity to provide power to every motorized feature in an aircraft, from lowering stowage bins and opening lavatory doors to deploying video monitors and compacting trash, added on top of cabin pressure monitoring and other control systems, can be expensive for an aircraft to maintain. Therefore, it is desirable to provide a lift assist mechanism that is safe to provide and inexpensive to maintain, having a minimum draw of electrical power. It is further desirable to provide a lift assist mechanism to provide power for opening and closing stowage containers and aircraft galley and closet overhead bins, to provide power when there is risk that a human could be trapped or injured, to provide power for articulation of aircraft seats, leg rests and the like, to provide power assistance in deploying an expandable compartment such as a crew rest or lavatory, to provide power assistance in retrieving galley carts or standard units from a rear of a galley, to provide power to compact trash, to provide power to deploy overhead video monitors, to provide power assistance to open and close doors and other panels, such as deployable credenzas and the like, to provide variable comfort control to mattresses and other cushions within an aircraft cabin, to provide power assistance for variable geometry seating to assist in reconfiguring a cabin, and the like.

Hence, it would be desirable to provide a vacuum powered lift assist mechanism that can be used with aircraft overhead stowage bins or other types of stowage containers or devices, that can be retrofitted in combination with existing aircraft overhead stowage bins. It would also be desirable to provide a vacuum powered overhead closet system utilizing vacuum actuation for a lifting mechanism, requiring a minimum draw of electrical power. The present invention meets these and other needs.

SUMMARY OF ILLUSTRATIVE EMBODIMENTS

Briefly, and in general terms, the present invention provides for a vacuum powered system for moving a movable component movable in opposing first and second directions between first and second positions relative to a fixed structure. The vacuum powered system can be used with aircraft overhead stowage bins or other types of stowage containers or devices, for articulation of aircraft seats, leg rests and the like, deploying an expandable compartment such as a crew rest or lavatory, retrieving galley carts or standard units from a rear of a galley, compacting trash, deploying overhead video monitors, opening and closing doors and other panels, variable comfort control of mattresses and other cushions, reconfiguring seating in a cabin, and the like. The vacuum powered system utilizes a vacuum powered lifting system or lift assist mechanism that can be retrofitted in existing aircraft, and utilizes vacuum actuation for lifting, requiring a minimum draw of electrical power.

Accordingly, the present invention provides for a vacuum powered system that includes a movable component, a vacuum actuator mounted to a fixed structure, and a portion of the vacuum actuator connected to the movable component. The vacuum actuator is configured to move the movable component between first and second positions relative to the fixed structure. One or more intake ports of the vacuum powered system are configured to be connected in fluid communication with a source of vacuum for moving the movable component in a first direction to the first position, and the vacuum actuator includes one or more bleed valve ports configured to vent the vacuum actuator to allow the movable component to move in a second direction to the second position.

In one presently preferred aspect, the vacuum actuator includes an air bellows having a lower end attached to a top portion of the movable component, and an upper end mounted to the fixed structure. In another presently preferred aspect, the upper end of the air bellows is connected in fluid communication with an air manifold configured to provide a source of vacuum and venting to the air bellows. In another presently preferred aspect, the air manifold includes one or more intake ports for providing vacuum to the air bellows to move the movable component in the first direction to the first position, and one or more bleed valve ports for venting the air bellows to move the movable component in the second direction to the second position.

In another presently preferred aspect, the vacuum actuator includes a linear vacuum actuator. In one presently preferred variation, the vacuum actuator includes a single acting linear vacuum actuator having a piston and a cylinder with first and second ends. The piston is disposed in the cylinder for sliding reciprocating movement of the piston within the cylinder, and an actuator rod that is connected to the piston extends through a seal at the second end of the cylinder and connects to the movable component. A vacuum connection is provided in fluid communication with the first end of the cylinder for providing a vacuum to the single acting linear vacuum actuator to move the movable component in the first direction to the first position, and a bleed valve is connected in fluid communication with the first end of the cylinder for venting of the single acting linear vacuum actuator to allow the movable component to move in the second direction to the second position.

In a presently preferred variation, the vacuum actuator includes a dual acting linear vacuum actuator having a piston and a cylinder with first and second ends. The piston is disposed in the cylinder for sliding reciprocating movement of the piston within the cylinder, and an actuator rod connected to the piston extends through a seal at the second end of the cylinder and connects to the movable component. A first vacuum connection is provided in fluid communication with the first end of the cylinder for providing vacuum to the dual acting linear vacuum actuator to move the movable component in the first direction to the first position, and a first bleed valve is provided in fluid communication with the first end of the cylinder to vent the dual acting linear vacuum actuator to allow the movable component to move in the second direction to the second position. Moreover, a second vacuum connection is provided in fluid communication with the second end of the cylinder for providing vacuum to the dual acting linear vacuum actuator to move the piston and in turn the movable component in the second direction to the second position, and a second bleed valve is provided in fluid communication with the second end of the cylinder to vent the dual acting linear vacuum actuator to allow the movable component to move in the first direction to the first position.

In a presently preferred aspect, the movable component comprises a stowage container. In another preferred aspect, the fixed structure includes a stationary stowage container housing that houses the vacuum actuator. In another preferred aspect, the stationary stowage container housing is an above ceiling closet box.

In another preferred aspect, one or more elongated tracks having first and second ends are provided in the stationary stowage container housing, and one or more corresponding guide elements are provided on the movable component. The corresponding guide elements are movably engaged with the one or more elongated tracks between the first and second ends to move the movable component between the first position and the second position. In another preferred aspect, the one or more elongated tracks include a first set of linear tracks on opposing inner side walls of the stationary stowage container housing, and the one or more corresponding guide elements include a second set of linear tracks on opposing outer side walls of the stowage container. The second set of linear tracks are slidably connected to the first set of linear tracks for guiding movement of the stowage container between the first and second positions.

In a presently preferred aspect, the vacuum powered system is configured to move or lift a movable component between a raised and lowered position. In another presently preferred aspect, the vacuum powered system is configured to move a stowage container between a stowed and deployed position.

In a further presently preferred aspect, the present invention provides for a method for moving a movable component movable in opposing first and second directions between first and second positions relative to a fixed structure. According to a presently preferred aspect, the method includes connecting a movable component to a vacuum actuator, applying a source of vacuum to the vacuum actuator through one or more intake ports that are in fluid communication with the vacuum actuator to move the movable component in a first direction to a first position, and venting the vacuum actuator through one or more bleed ports that are in fluid communication with the vacuum actuator to move the movable component in a second direction to a second position. In another presently preferred aspect, the method further includes latching the movable component in the first position after applying the source of vacuum to the vacuum actuator, and latching the movable component in the second position after venting the vacuum actuator.

These and other aspects and advantages of the invention will become apparent from the following detailed description and the accompanying drawings, which illustrate by way of example the features of the invention.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIG. 9 is a perspective view of a vacuum powered lifting system according to the invention having a single acting linear vacuum actuator for the vacuum powered lifting system of FIG. 8.

FIG. 10 is a cross-sectional view of the vacuum powered lifting system of FIG. 9 taken along line 10-10, showing a piston that actuates a stowage container (not shown) in a first direction, such as for raising or stowing a stowage container, when vacuum is provided to the single acting linear vacuum actuator.

FIG. 11 is a cross-sectional view similar to FIG. 10, showing the piston released in a second direction, such as for lowering or deploying a stowage container, when venting the single acting linear vacuum actuator.

FIG. 12 is a perspective view of a vacuum powered lifting system according to the invention having a dual acting linear vacuum actuator for the vacuum powered lifting system of FIG. 8.

FIG. 13 is a cross-sectional view of the vacuum powered lifting system of FIG. 12 taken along line 13-13, showing a piston that actuates a stowage container (not shown) in a first direction, such as for raising or stowing a stowage container, when vacuum is provided to the dual acting linear vacuum actuator and when venting the dual acting linear vacuum actuator.

FIG. 14 is a cross-sectional view similar to FIG. 13, where the piston actuates the stowage container (not shown) in a second direction, such as for lowering or deploying a stowage container, when vacuum is provided to the dual acting linear vacuum actuator and when venting the dual acting linear vacuum actuator.

DETAILED DESCRIPTION OF ILLUSTRATIVE EMBODIMENTS

Figure 1:
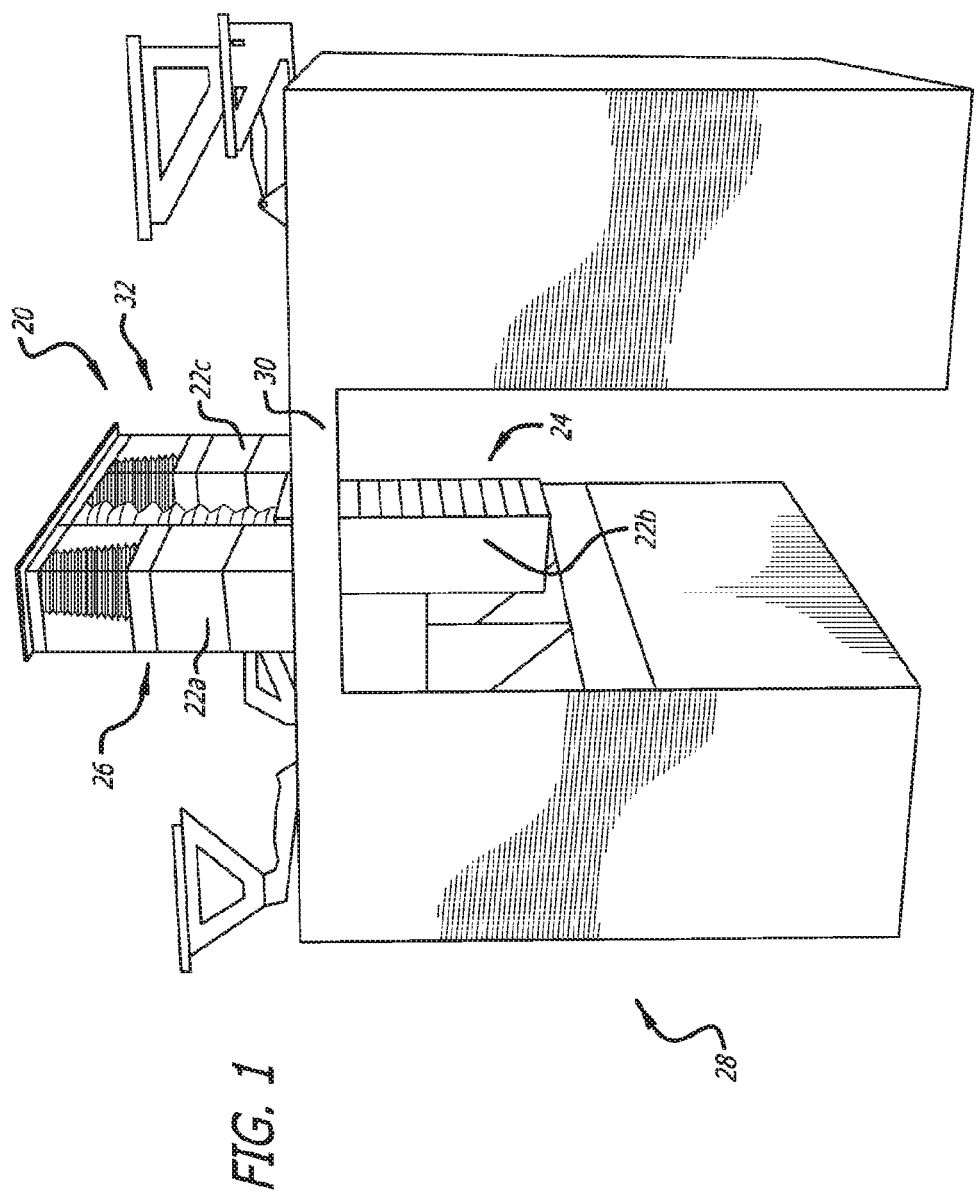
FIG. 1 is a front perspective view of above ceiling closet boxes housing stowage containers in a full service aircraft galley, illustrating a vacuum powered lifting system according to the invention, where two of the stowage containers are in a raised or stowed position inside the above ceiling closet boxes and one of the stowage containers is in a lowered or deployed position, with side panels of the above ceiling closet boxes removed for clarity.

Referring to the drawings, which are provided by way of illustration and example, and not by way of limitation, the present invention provides for a vacuum powered system 20 for moving or lifting one or more movable components, for example stowage containers 22a, 22b, and 22c, between a first position and a second position. As shown in FIGS. 1-7, the vacuum powered system provides a lifting force for moving stowage containers in an aircraft between a lowered or deployed position 24 for accessing the stowage container for loading and unloading items, and a raised or stowed position 26 for storing the stowage container.

Figure 2:
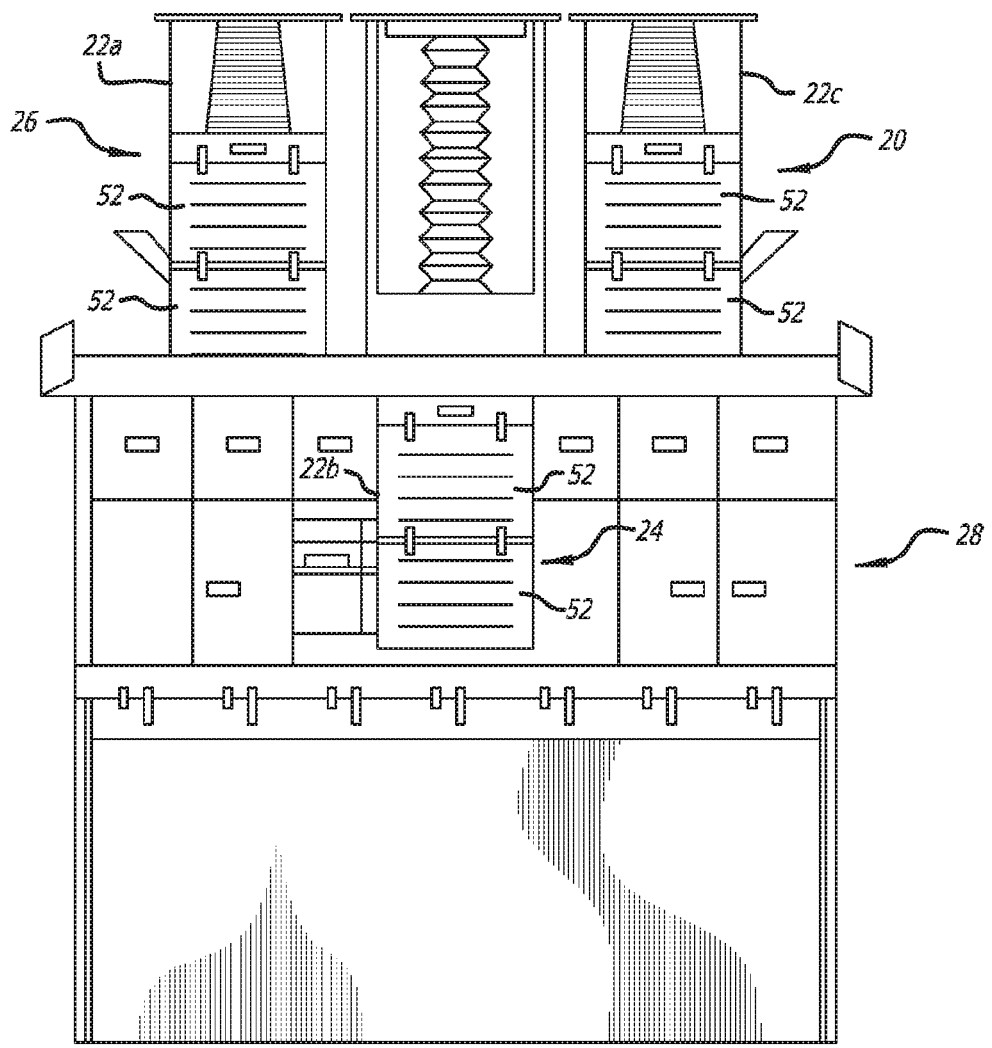
FIG. 2 is a front view of the above ceiling closet boxes and stowage containers, illustrating the vacuum powered lifting system of FIG. 1, with side panels of portions of the above ceiling closet boxes removed for clarity.

Referring to FIGS. 1 and 2, according to a presently preferred aspect, the vacuum powered system is implemented in a full service aircraft galley 28, which typically includes a beverage center, one or more oven and/or chiller units, one or more galley cart bays, and the like. Aircraft galley typically includes a ceiling panel 30, with storage space 32 above the ceiling panel for an overhead stowage of a plurality of stowage containers. In an exemplary aspect, the storage space 32 includes three abreast stowage containers, including a center unit 22b shown in a lowered or deployed position for loading or unloading items from the stowage container, and two side units 22a and 22c shown in a raised or stowed position for storing the stowage containers. In another exemplary aspect, each stowage container removably receives and stores one or more standard storage units 52 in which items are loaded or unloaded.

Figure 3:
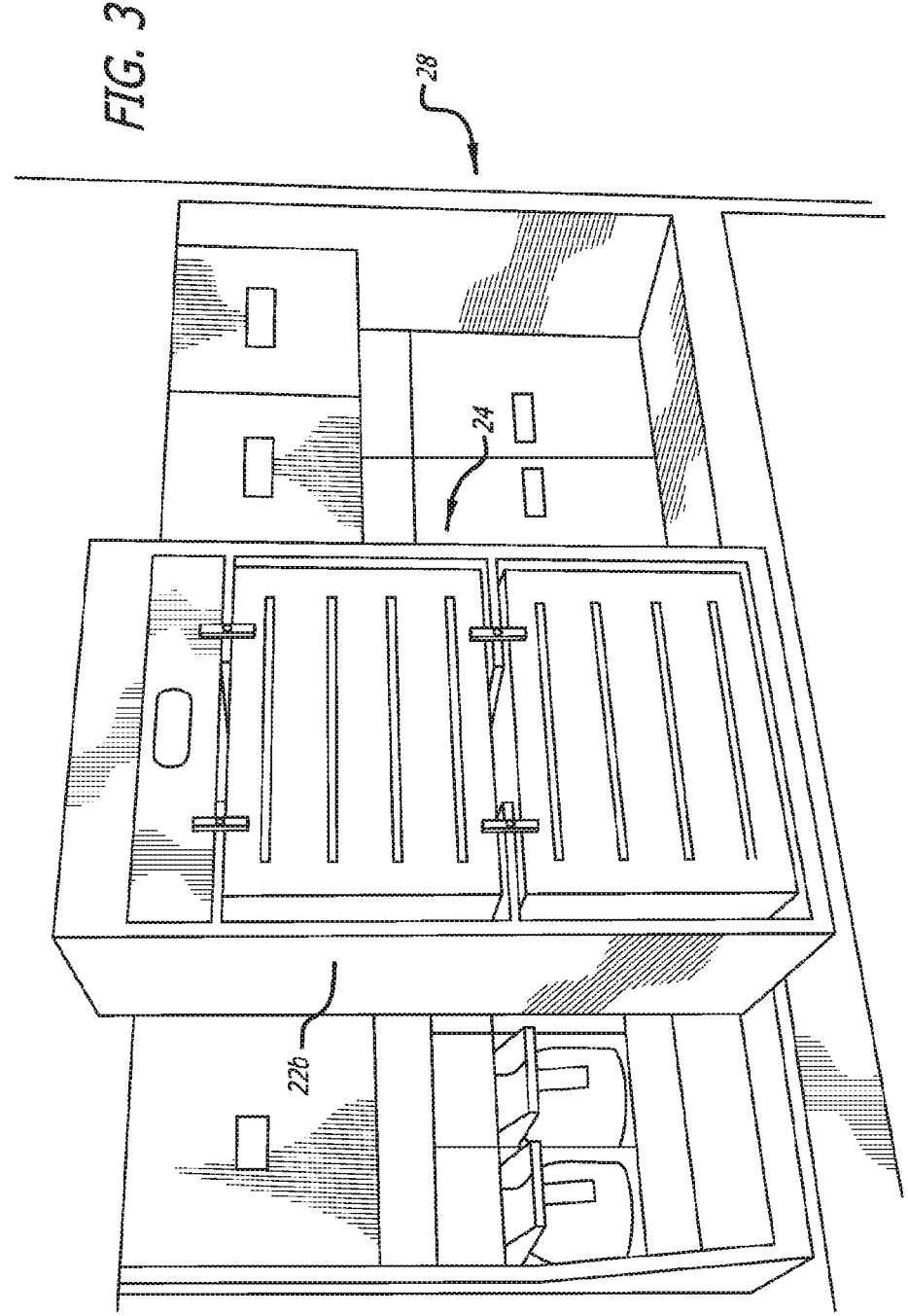
FIG. 3 is a front perspective view of the lowered stowage container of FIG. 1.
Figure 4:
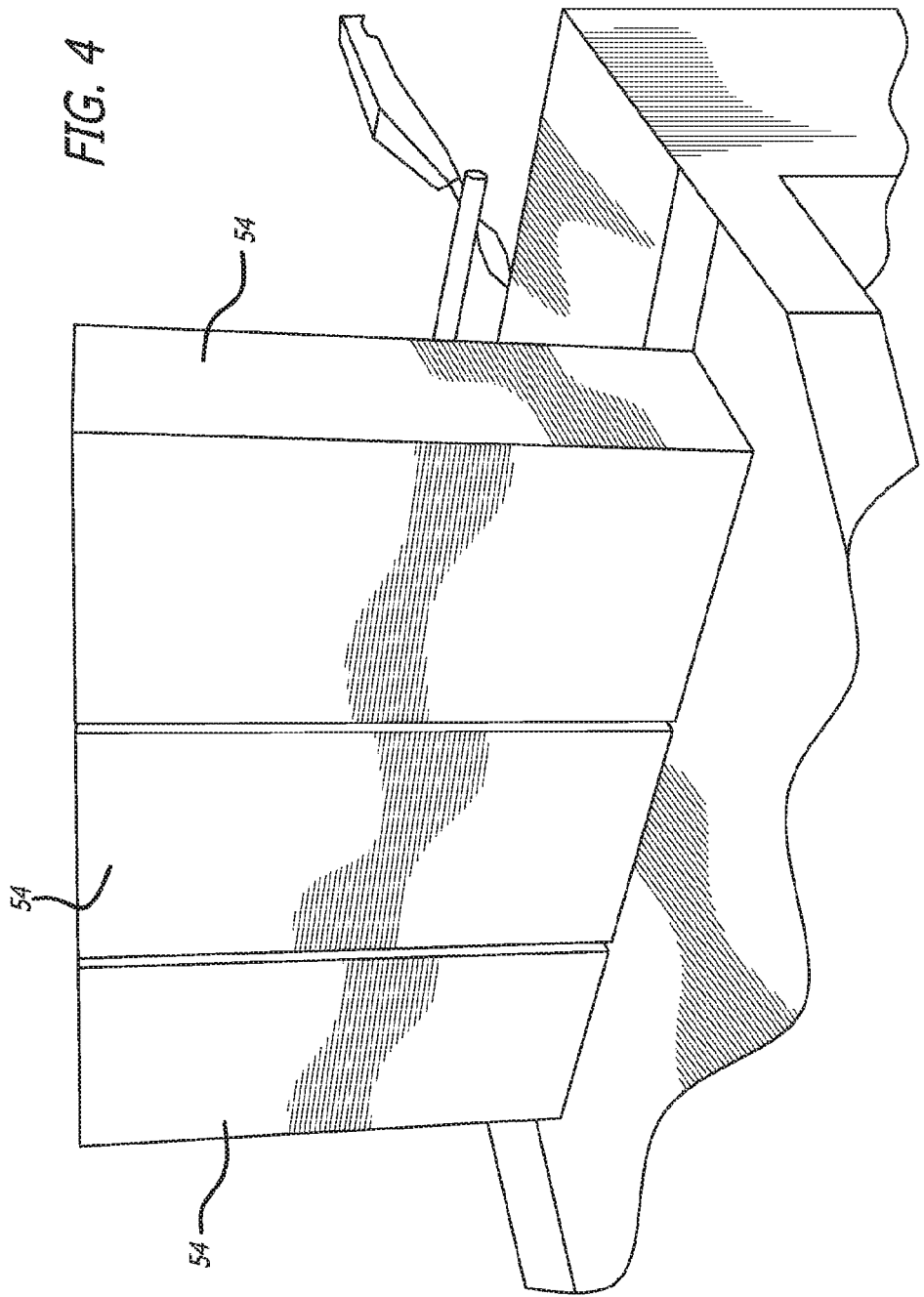
FIG. 4 is a front perspective view of the above ceiling closet boxes of FIG. 1.

FIG. 3 illustrates the lowered stowage container 22b in the aircraft galley. In an exemplary aspect, a flight attendant in the aircraft galley uses the vacuum powered system to lower a stowage container having one or more standard storage units into a deployed position. The flight attendant then proceeds to load or unload items into the standard storage units. When the flight attendant is finished loading or unloading items into the stowage container, the flight attendant uses the vacuum powered system to lift the stowage container back into a stowed position above the ceiling panel.

Figure 5:
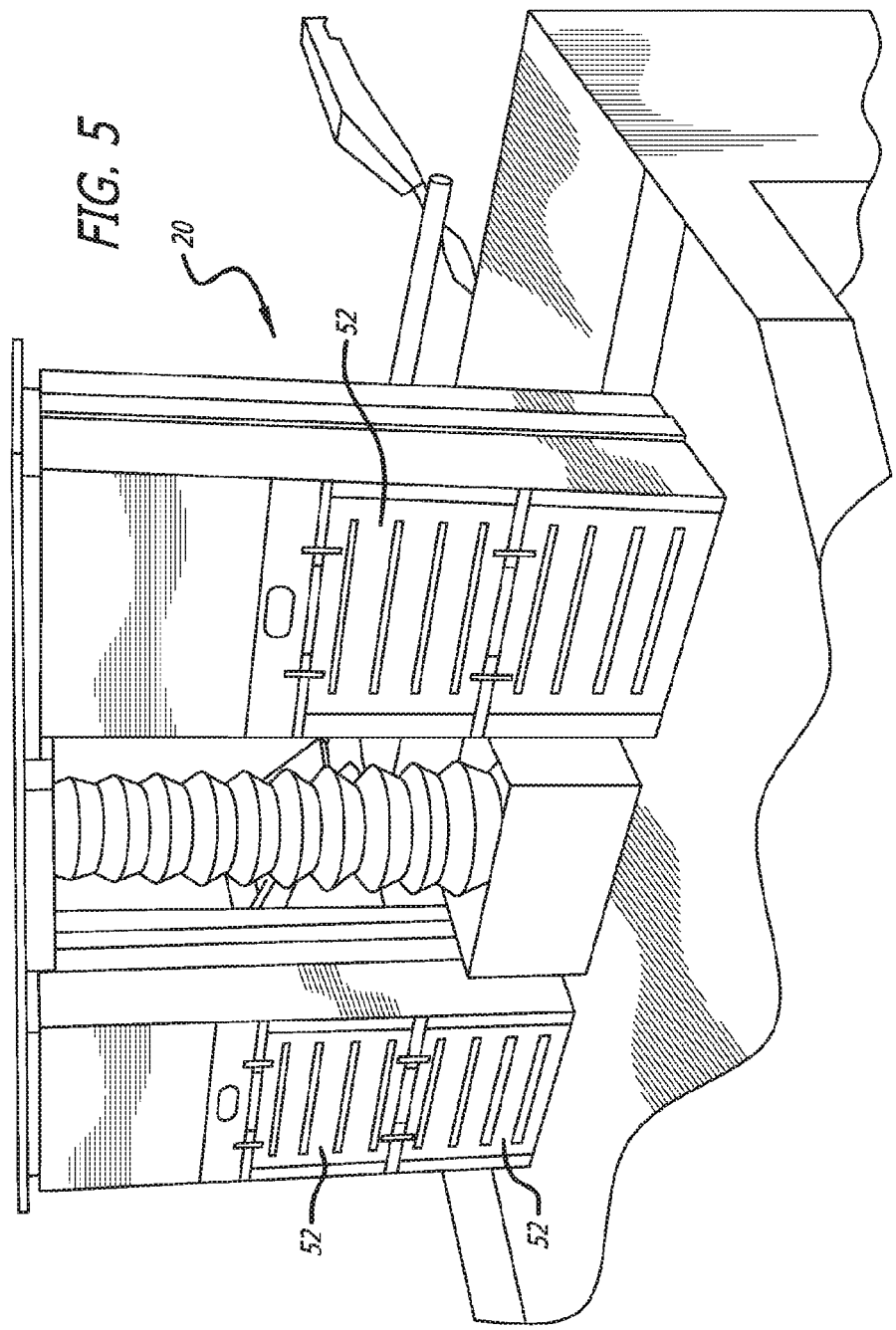
FIG. 5 is a front perspective view of the above ceiling closet boxes and stowage containers of FIG. 1, with side panels of the above ceiling closet boxes removed for clarity.
Figure 6:
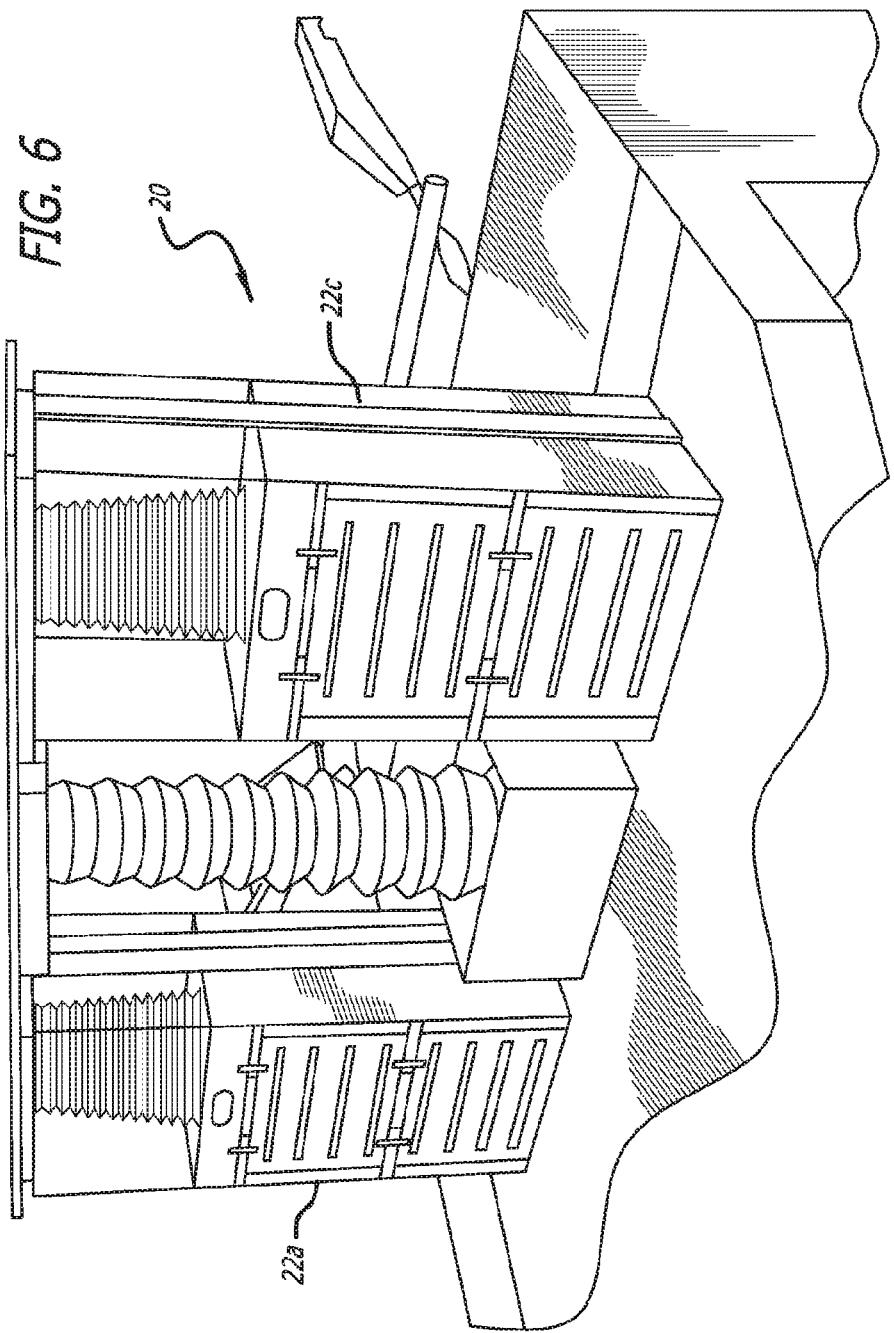
FIG. 6 is a front perspective view of the above ceiling closet boxes and stowage containers of FIG. 1, with side panels of upper portions of the above ceiling closet boxes removed for clarity.

FIGS. 4-7 show that the movable components or stowage containers are contained in, and move relative to, a fixed structure 54. As can be seen in FIGS. 5 and 6, according to one aspect, the fixed structure is a stationary stowage container housing or above ceiling closet box which houses the stowage container. Each movable component is connected to a vacuum actuator 34, which in turn, is mounted to the fixed structure as shown in FIG. 6. With respect to FIG. 7, each stowage container housing includes one or more intake ports 48 configured to connect in fluid communication with a source of vacuum for raising the stowage container, and one or more bleed valve ports 50 configured to vent the vacuum actuator for lowering the stowage container.

Figure 7:
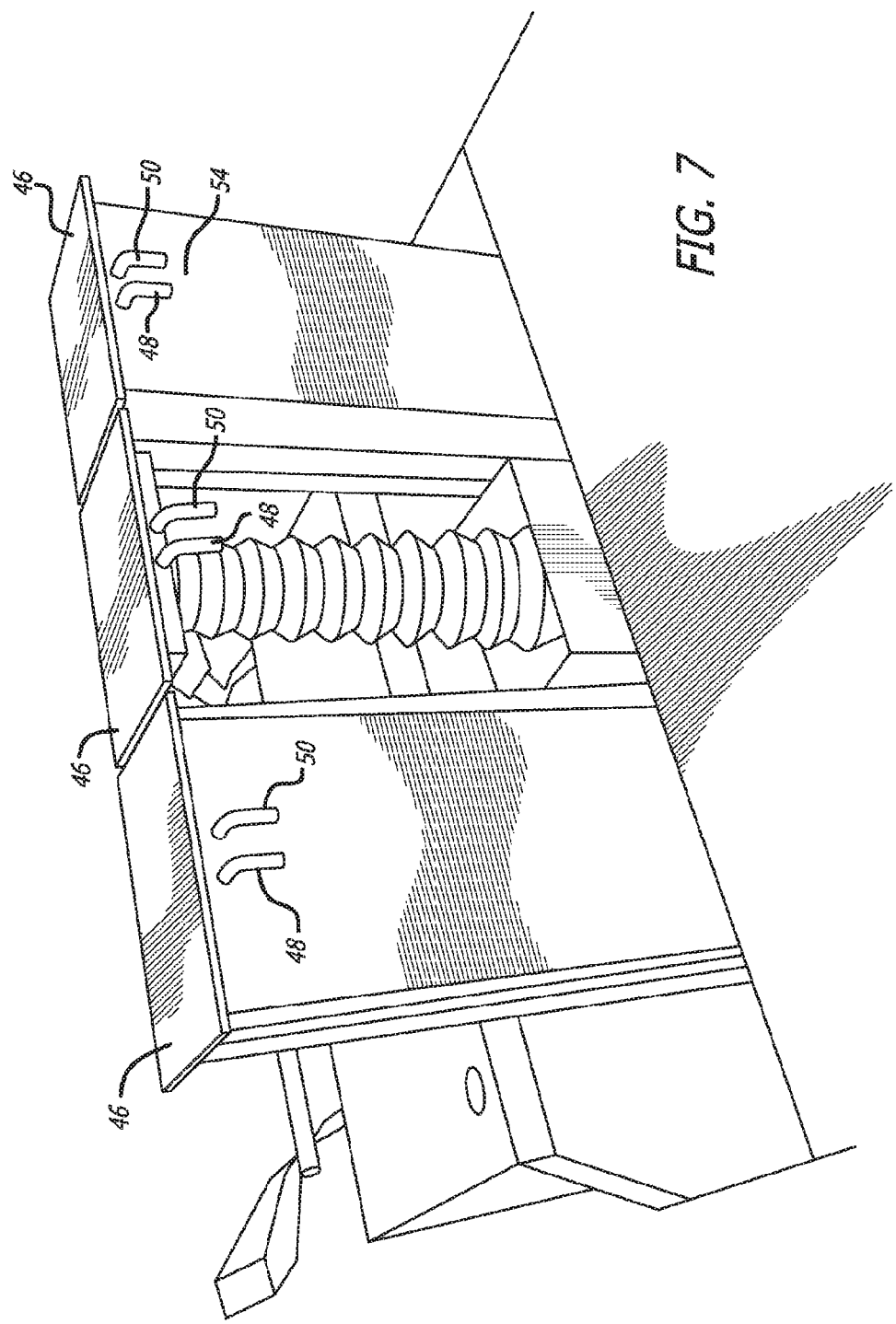
FIG. 7 is a rear perspective view of the above ceiling closet boxes and stowage containers of FIG. 1.
Figure 8:
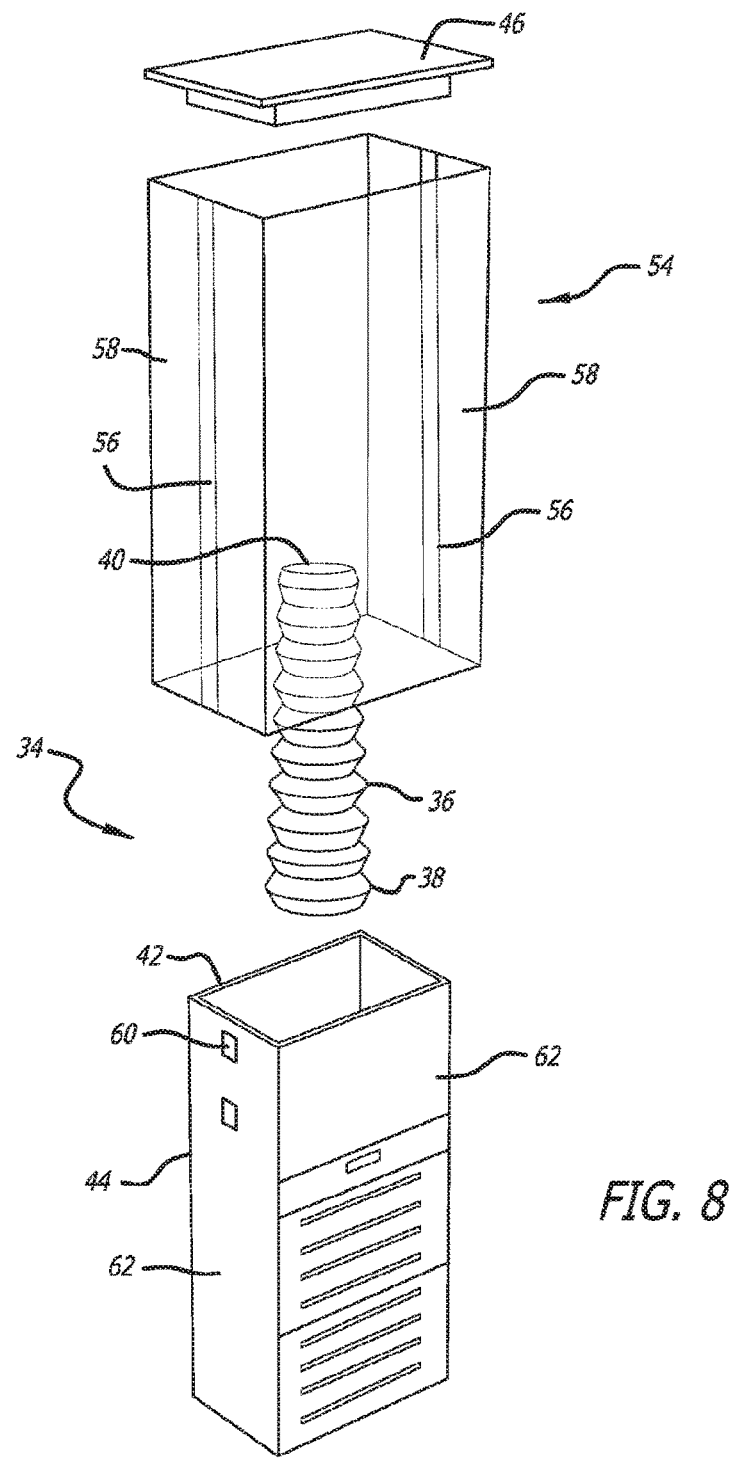
FIG. 8 is an exploded view of an embodiment of a vacuum powered lifting system according to the invention having air bellows.

Referring to FIG. 8, in a presently preferred aspect, the vacuum actuator 34 includes an air bellows 36 having a lower end 38 and an upper end 40. The lower end of the air bellows is typically attached to a top portion 42 of the movable component or stowage container 44, and the upper end of the air bellows is typically attached to the fixed structure. In a preferred aspect, the fixed structure includes an air manifold 46 that is connected in fluid communication with the upper end of the air bellows and that provides a source of vacuum or venting to the air bellows. In an exemplary aspect, as shown in FIG. 7, the air manifold typically includes one or more intake ports 48 for providing vacuum to the air bellows to raise the stowage container, and one or more bleed valve ports 50 for venting the air bellows to lower the stowage container. In another aspect, the fixed structure of the vacuum powered system includes a stationary stowage container structure or housing such as an above ceiling closet box 54 that houses the vacuum actuator.

When vacuum is provided to the air bellows through the one or more intake ports of the air manifold, for example by a vacuum pump or other vacuum device, the vacuum creates a pulling force that causes the air bellows to compress and, in turn, raise the stowage container relative to the stationary stowage container housing until the stowage container reaches a raised or stowed position. When vacuum is no longer applied, pressure is vented through the one or more bleed valves of the air manifold, causing the air bellows to expand and, in turn, lower the stowage container relative to the stationary stowage container housing until the stowage container reaches a lowered or deployed position.

In another presently preferred aspect, the stationary stowage container housing includes one or more elongated tracks, namely a first set of linear tracks 56, on opposing inner side walls 58 of the stationary stowage container housing or above ceiling closet box, and corresponding guide elements, namely a second set of linear tracks or guides 60, on opposing outer side walls 62 of the stowage container. In one aspect, the one or more corresponding guide elements on the movable component or stowage container are movably engaged with the one or more elongated tracks in the stationary stowage container housing such that the stowage container can move between the raised position and lowered position. In a preferred aspect, the second set of linear tracks are slidably connected to the first set of linear tracks in the stationary stowage container housing or above ceiling closet box to provide a guiding system for sliding movement of the one or more stowage containers between the lowered or deployed position and the raised or stowed position. In a preferred aspect, the vacuum powered system includes latching systems, for example one or more latches, for releasably latching the stowage container in the lowered or deployed position and in the raised or stowed position.

Referring to FIGS. 9-14, in a presently preferred aspect, the vacuum powered system of the present invention, such as for overhead stowage, includes a single acting linear vacuum actuator or dual acting linear vacuum actuator that functions similarly to a pneumatic actuator, but is actuated by negative pressure, or vacuum, instead of positive pressure.

As shown in FIGS. 9-11, a single acting linear vacuum actuator 70 includes a piston 72 with multiple seals that is housed or disposed for sliding reciprocating movement within a cylinder 74 having a first end 76 and a second end 78. The single acting linear vacuum actuator 70 utilizes vacuum provided through a vacuum hookup or vacuum connection 80 at the first end of the cylinder to provide a lifting force or pulling force for movement of the piston in a first direction 82. An actuator rod 84 is connected to the piston, extends through a seal 86 at the second end of the cylinder, and is connected to an object that is to be lifted or moved, such as a movable component or stowage container.

When vacuum is provided to the single acting linear vacuum actuator through the vacuum connection, the piston moves and pulls the movable component in the first direction relative to the cylinder until the movable component reaches the raised or stowed position as described previously. A bleed valve 88 is also provided at the first end of the cylinder to allow for controlled venting of the single acting linear vacuum actuator, thereby allowing the actuator rod, and in turn, the movable component, to move in an opposing direction 90 relative to the cylinder into the lowered or deployed position as described previously. In an aspect, the vacuum powered system includes a latching system for releasably latching the stowage container in the lowered or deployed position and the raised or stowed position.

In a presently preferred variation, the linear vacuum actuator includes a piston housed for reciprocating movement in a cylinder and is dual acting, that is, utilizing vacuum to alternatingly provide a lifting force or pulling force in opposing directions. Referring to FIGS. 12-14, a dual acting linear vacuum actuator 170 includes a piston 172 with multiple seals that is housed for sliding reciprocating movement within a cylinder 174 having a first end 176 and a second end 178. The dual acting linear vacuum actuator 170 utilizes vacuum provided through a first vacuum connection 180 at the first end of the cylinder to provide a lifting force or pulling force for movement of the piston in a first direction 182. An actuator rod 184 is connected to the piston, extends through a seal 186 at the second end of the cylinder, and is connected to an object to be lifted or moved, such as a movable component or stowage container.

When vacuum is provided to the dual acting linear vacuum actuator through the first vacuum connection, the piston moves and pulls the movable component in the first direction relative to the cylinder until the movable component reaches the raised or stowed position as described previously. A first bleed valve 188 is provided at the first end of the cylinder to allow for controlled venting of the dual acting linear vacuum actuator, thereby allowing the actuator rod, and in turn, the movable component, to move in an opposing second direction 192 relative to the cylinder into the lowered or deployed position as described previously.

However, unlike the single acting linear vacuum actuator, the dual acting linear vacuum actuator further includes a second vacuum connection 190 and a second bleed valve 194 advantageously provided at the second end 178 of the cylinder. The dual acting linear vacuum actuator utilizes vacuum provided through the second vacuum connection 190 at the second end of the cylinder to provide a lifting or pulling force for movement of the piston, and in turn, the movable component, in the second direction 192 relative to the cylinder until it reaches the lowered or deployed position. A second bleed valve 194 is also provided at the second end of the cylinder to allow for controlled venting of the dual acting linear vacuum actuator, thereby allowing the piston and, in turn, the movable component, to move back in the first direction 182 relative to the cylinder until it reaches the raised or stowed position. In an aspect, the vacuum powered system includes latching systems for releasably latching the stowage container in the lowered or deployed position and the raised or stowed position.

It will be apparent from the foregoing that while particular forms of the invention have been illustrated and described, various modifications can be made without departing from the spirit and scope of the invention. Accordingly, it is not intended that the invention be limited, except as by the appended claims.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A vertically stowable aircraft storage unit for providing additional storage in a cabin area of an aircraft, the stowable aircraft storage unit comprising:
   a storage compartment;
   a vacuum lift mechanism comprising
      at least one vacuum actuator, and
      an air manifold in fluid communication with a vacuum source, the air manifold configured to provide vacuum and venting to the at least one vacuum actuator; and
   a stowage container housing for receiving the storage compartment in the stowed position, wherein the stowage container housing is configured for mounting above a ceiling of the cabin area;
   wherein the vacuum actuator is mounted for lifting and lowering the storage compartment between the stowed position and a deployed position.

2. The vertically stowable aircraft storage unit of claim 1, wherein the vacuum actuator is mounted at one end to the stowage container housing and at an opposite end to the storage compartment for lifting and lowering the storage compartment.

3. The vertically stowable aircraft storage unit of claim 1, wherein the stowable aircraft storage unit is configured as part of an aircraft galley monument.

4. The vertically stowable aircraft storage unit of claim 3, wherein the storage container is configured to receive and retain at least one aircraft galley standard unit container.

5. The vertically stowable aircraft storage unit of claim 1, wherein the vacuum source is configured to provide vacuum for both the vertically stowable aircraft storage unit and a second storage unit.

6. The vertically stowable aircraft storage unit of claim 1, further comprising a latching system for releasably latching the storage container in the stowed position.

7. The vertically stowable aircraft storage unit of claim 1, wherein
   the stowage container housing comprises at least one linear guide element; and
   the storage compartment comprises at least one mating linear guide element configured to mate with a respective one of the at least one linear guide element of the stowage container.

8. The vertically stowable aircraft storage unit of claim 1, wherein the air manifold comprises at least one bleed valve port for venting the vacuum actuator, wherein the stowage container lowers to the deployed position upon venting of the vacuum actuator using the at least one bleed valve port.

9. A method for storing items above a ceiling of a cabin area of a passenger aircraft, the method comprising:
mounting a stowage container housing above a ceiling of the cabin area, wherein the stowage container housing is configured to receive a storage compartment in a stowed position; and
installing a vacuum lift mechanism for lifting and lowering the storage compartment, the vacuum lift mechanism comprising
at least one vacuum actuator, and
an air manifold in fluid communication with a vacuum source, the air manifold configured to provide vacuum and venting to the at least one vacuum actuator;
wherein the vacuum lift mechanism is mounted at one end to the stowage container housing and at an opposite end to the storage compartment for lifting and lowering the storage compartment between the stowed position and a deployed position.

10. The method of claim 9, further comprising venting the air manifold to move the storage compartment from the stowed position to the deployed position.

11. The method of claim 10, further comprising applying the vacuum source to the air manifold to move the storage compartment from the deployed position to the stowed position.

12. The method of claim 11, further comprising releasably latching the storage compartment in the stowed position using a latching system.

13. The method of claim 11, further comprising connecting the storage compartment to a plurality of linear guides, wherein the linear guides are movably engaged with a corresponding plurality of guide elements for moving the storage compartment between the stowed position and the deployed position.

14. The method of claim 13, wherein each of the plurality of guide elements is connected to the stowage container housing.

15. The method of claim 9, wherein the storage container is configured to receive and retain a plurality of aircraft galley standard unit containers.

16. The method of claim 9, wherein mounting the stowage container housing above the ceiling of the cabin area comprises mounting the stowage container housing above the ceiling of a galley region of the cabin area.

17. The method of claim 9, wherein the stowage container housing is configured to receive a second storage compartment.

18. The method of claim 17, wherein the second storage compartment is configured for stowing and deploying separately from the storage compartment such that the storage compartment may be in the stowed position while the second storage compartment is in the deployed position.

19. The method of claim 17, wherein each of the storage compartment and the second storage compartment is configured to releasably receive a respective standard unit container.

20. The method of claim 19, wherein the stowage container housing is configured to receive a third storage compartment, wherein the storage compartment, the second storage compartment, and the third storage compartment are aligned horizontally while in the stowed position.

* * * * *